US010855538B2

(12) United States Patent
Gopalarathnam

(10) Patent No.: US 10,855,538 B2
(45) Date of Patent: Dec. 1, 2020

(54) SINGLE MANAGEMENT CONNECTION AUTOMATIC DEVICE STACK CONFIGURATION SYSTEM

(71) Applicant: Dell Products L.P., Round Rock, TX (US)

(72) Inventor: Sudharsan Dhamal Gopalarathnam, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 16/260,560

(22) Filed: Jan. 29, 2019

(65) Prior Publication Data
US 2020/0244533 A1 Jul. 30, 2020

(51) Int. Cl.
G06F 15/177 (2006.01)
H04L 12/24 (2006.01)
(52) U.S. Cl.
CPC ...... H04L 41/0886 (2013.01); H04L 41/0853 (2013.01); H04L 41/0873 (2013.01); H04L 41/0893 (2013.01); H04L 41/0806 (2013.01); H04L 41/0813 (2013.01)
(58) Field of Classification Search
CPC .................. H04L 41/0886; H04L 41/0853
See application file for complete search history.

(56) References Cited

U.S. PATENT DOCUMENTS 10,015,074 B1 * 7/2018 Chandra ................. H04L 45/02
10,153,944 B2 * 12/2018 Lin ..................... H04L 41/0873
2002/0046271 A1 * 4/2002 Huang ..................... H04L 45/28
709/223
2002/0085551 A1 * 7/2002 Tzeng ................... H04L 47/266
370/389
2006/0092832 A1 * 5/2006 Santoso ................ H04L 45/583
370/218
2010/0257283 A1 * 10/2010 Agarwal ............. H04L 41/0806
709/250
2012/0147785 A1 * 6/2012 Wang ..................... H04L 49/40
370/254
2015/0117263 A1 * 4/2015 Agarwal ................ H04L 49/65
370/255
2016/0246618 A1 * 8/2016 Gopalarathnam ...... H04L 67/34

* cited by examiner

Primary Examiner — Hua Fan
(74) Attorney, Agent, or Firm — Haynes and Boone, LLP

(57) ABSTRACT

An automatic device stack configuration system includes a master stack unit coupled to a management device and member stack devices. The master stack device receives member stack device addresses from the management device, identifies a first subset of member stack device addresses received via its respective ports, and configures each of those respective ports as stack ports. The master stack device then transmits a second subset of member stack device addresses that were not received via its ports to the member stack devices associated with the first subset of member stack device addresses. When the master stack device receives identifications that ports on the member stack devices that received the second subset of the member stack device addresses have been configured as stack ports, it reboots the master stack device and member stack devices. Following the reboot, a stack including the master stack device and member stack devices is provided.

20 Claims, 14 Drawing Sheets

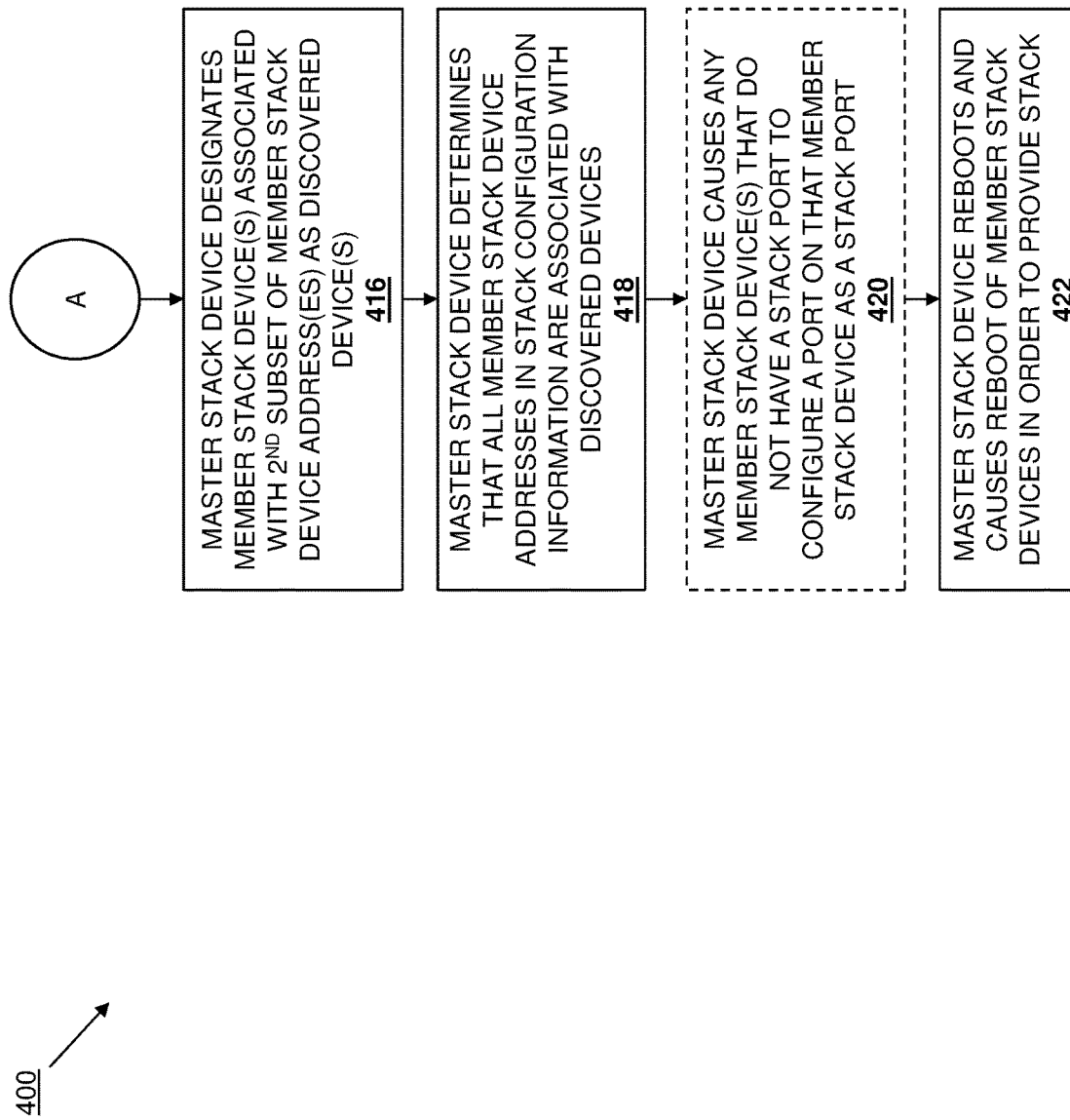

SINGLE MANAGEMENT CONNECTION AUTOMATIC DEVICE STACK CONFIGURATION SYSTEM

BACKGROUND

The present disclosure relates generally to information handling systems, and more particularly to automatically configuring a stack of a plurality of information handling systems via a single management connection.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are sometimes provided as a stack that configures the multiple switch devices to operate as a unified switch system, with Layer 2 (L2) and Layer 3 (L3) protocols presenting the stack as a single entity to the network. As would be understood by one of skill in the art in possession of the present disclosure, stacked switches are connected together via stacking ports on those switch devices, with one of the switch devices operating as a master switch device that controls the stack, and the other switch devices operating as member switch devices that are controlled by the master switch device. Stacking switch devices simplifies network administration by providing a single management connection to the stack (e.g., via the master switch device) during stack operation, increases scalability via the ability to increase the number of switch devices in the stack as a network grows, increases deployment flexibility due to the switch devices in the stack having the capability of operating by themselves or as part of the stack, provides for resilient connections by including ports on different switch devices that are available in the stack such that if any individual switch devices becomes unavailable there will be ports on other switch devices in the stack that are available, and/or other stacking benefits that would be apparent to one of skill in the art. However, the conventional configuration of a stack raises some issues.

For example, in order to create a stack from a plurality of switch devices, each switch device that is to be included in the stack must have its stack ports configured by a network administrator. The conventional configuration of stack ports on the switch devices that are to be provided in a stack requires that the network administrator configure a management connection for each of those switch devices (e.g., via management cabling connected to a management device and a management port on each of those switch devices), log into each of those switch devices, and provide a stack configuration (or push a stack configuration file) that configures one or more ports on each of those switch device as a stack port. While the master switch device in the stack will include a management connection (e.g., via management cabling connected to a management port on the master switch device) during the operation of the stack, as well as a stack configuration for the stack, the need to provide temporary management connections to the member switch devices in the stack (e.g., via management cabling connected to a management port on the member switch devices), as well as the provisioning of stack configurations to the member switch devices, is time consuming for network administrators, as the member switch devices will not use those management connections during operation of the stack (i.e., the management of the stack is enabled via the management connection to the master switch device.)

Accordingly, it would be desirable to provide an improved stack configuration system.

SUMMARY

According to one embodiment, an Information Handling System (IHS) includes a processing system; and a memory system that is coupled to the processing system and that includes instructions that, when executed by the processing system, cause the processing system to provide a stack engine that is configured to: receive, from a management device, stack configuration information that includes a plurality of member stack device addresses; identify, in a master stack device port/address database, a first subset of the plurality of member stack device addresses that were received via respective ports that are coupled to the processing system; configure each of the respective ports that are coupled to the processing system and that received the first subset of member stack device addresses as stack ports; transmit, to each of a plurality of member stack devices that are associated with the first subset of the plurality of member stack device addresses, a second subset of the plurality of member stack device addresses that were not received via ports that are coupled to the processing system; receive, from at least some of the plurality of member stack devices, identifications that ports that are included on the plurality of member stack devices and that received the second subset of the plurality of member stack device addresses have been configured as stack ports and, in response, cause a reboot of the each of the plurality of member stack devices; and provide, following the reboot of each of the member stack devices, a stack that includes each of the plurality of member stack devices.

BRIEF DESCRIPTION OF THE DRAWINGS

FIG. 4B is a flow chart illustrating an embodiment of a portion of a method for automatically configuring a device stack via a single management connection.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
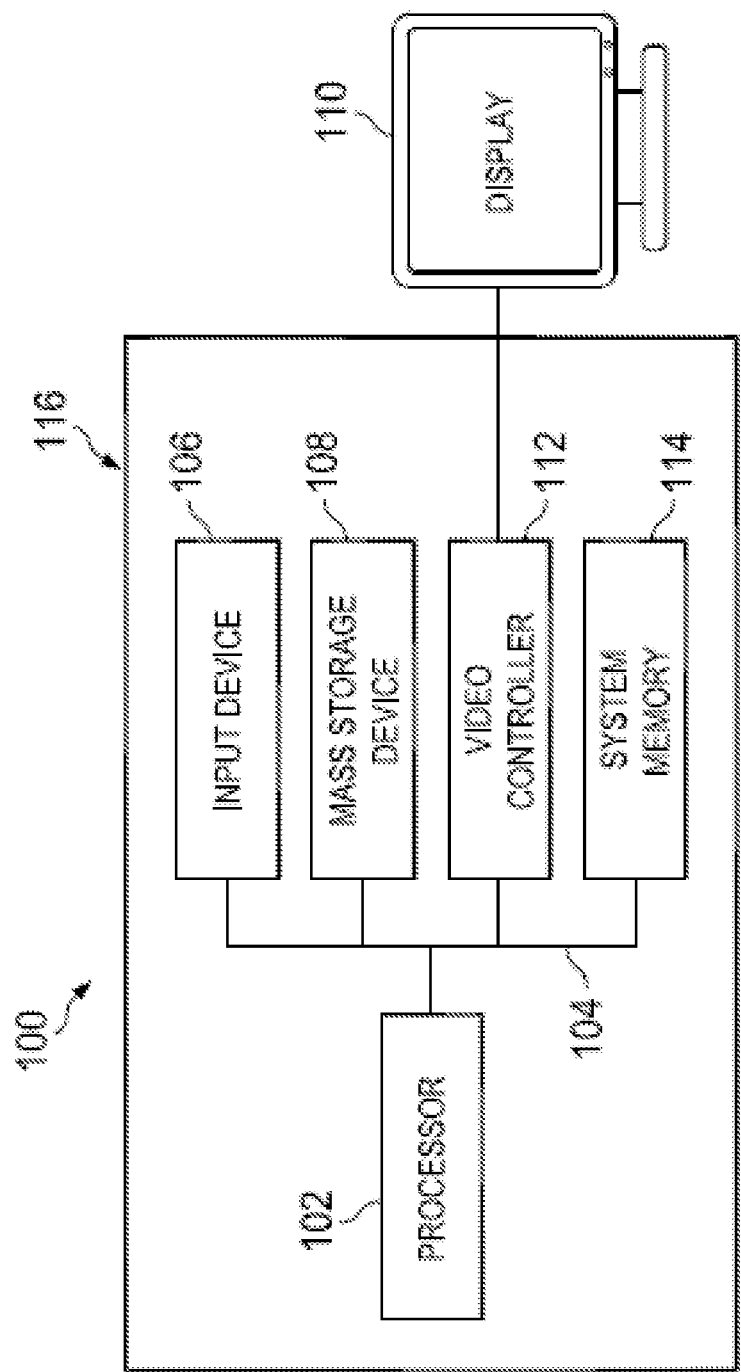
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
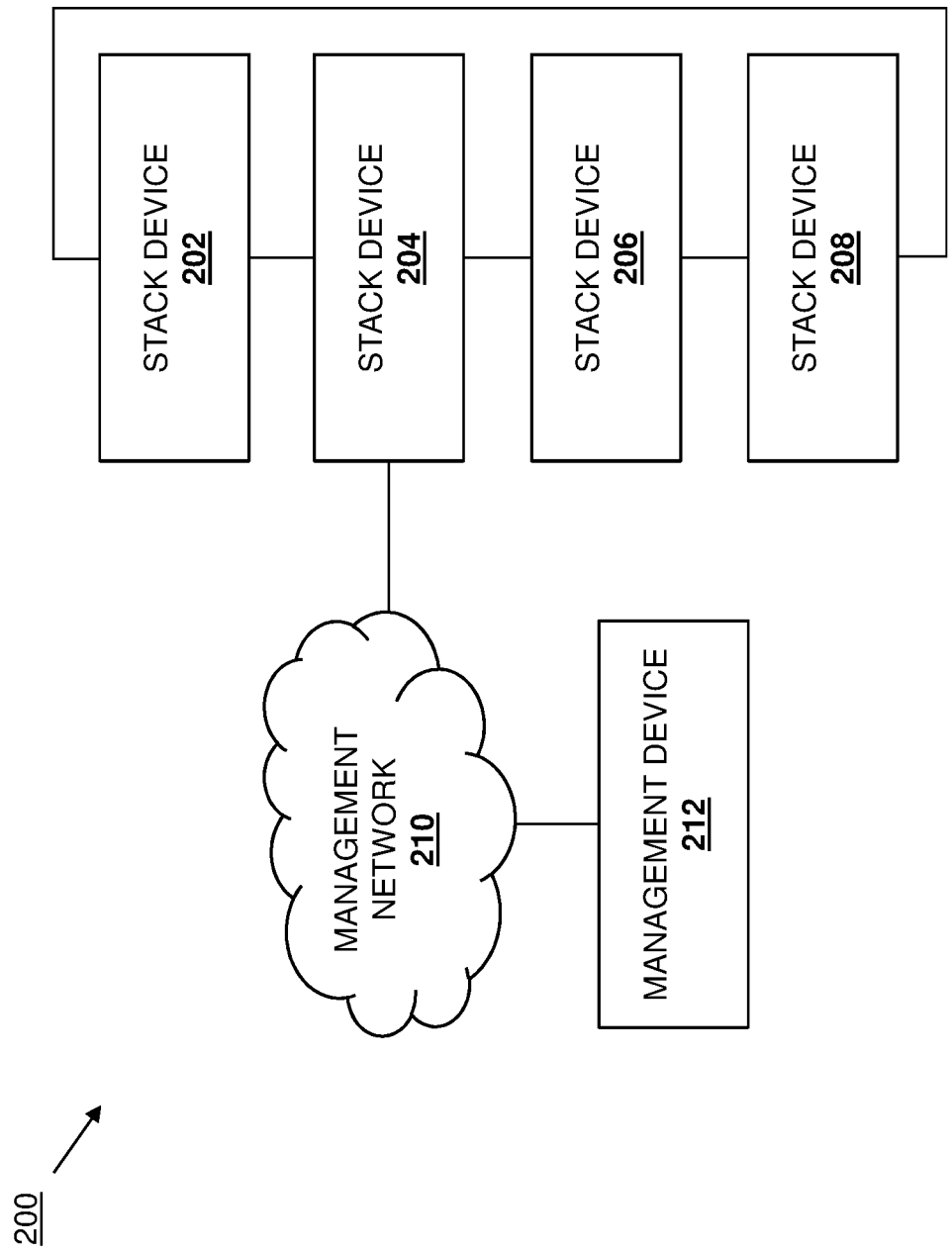
FIG. 2 is a schematic view illustrating an embodiment of a single management connection automatic device stack configuration system.

Referring now to FIG. 2, an embodiment of a single management connection automatic device stack configuration system 200 is illustrated. In the illustrated embodiment, the single management connection automatic device stack configuration system 200 includes a plurality of stack devices 202, 204, 206, and 208, any or all of which may be provided by the IHS 100 discussed above with reference to FIG. 1 and/or include some or all of the components of the IHS 100. For example, the stack devices 202-208 may be provided by networking devices such as switch devices, although one of skill in the art is possession of the present disclosure will recognize that other devices that can be stacked or otherwise configured to operate as a single logical entity may benefit from the teachings of the present disclosure and thus fall within its scope. In the embodiment illustrated in FIG. 2, the stack devices 202-208 are provided in a ring configuration via, for example, the connection of a port on the stack device 202 to a port on the stack device 204 (e.g., using a cable), the connection of a port on the stack device 204 to a port on the stack device 206 (e.g., using a cable), the connection of a port on the stack device 206 to a port on the stack device 208 (e.g., using a cable), the connection of a port on the stack device 208 to a port on the stack device 202 (e.g., using a cable). However, while illustrated in a ring configuration, as discussed below stack devices configured in a daisy chain configuration (e.g., without the connection of a port on the stack device 208 to a port on the stack device 202 illustrated in FIG. 2) will fall within the scope of the present disclosure as well.

In the examples provided below, the stack device 204 is provided as a master stack device in a stack that includes the stack devices 202, 206, and 208 as member stack devices. However, one of skill in the art in possession of the present disclosure will recognize that any stack device in a stack may be designated as a master stack device (with the remaining stack devices designated as member stack devices) while remaining within the scope of the present disclosure. As the master stack device, the stack device 204 is coupled to a management network 210 via, for example, a cabled connection to a management port on the stack device 204. As discussed below, the single management connection automatic device stack configuration system 200 only requires a single management connection to the master stack device in order to provide for the configuration of a stack that includes the master stack device and its member stack devices. However, while only a single management connection is required to perform the functionality discussed below, one of skill in the art in possession of the present disclosure will recognize that that single management connection may be provided by a single cable, multiple cables (e.g., connected to multiple ports in the stack device 204 that are provided in a Link Aggregation Group (LAG)), and/or in any other manner that would be apparent to one of skill in the art in possession of the present disclosure. Furthermore, while management connections are not necessary for the member stack devices, one of skill in the art in possession of the present disclosure will recognize that management connections may be provided to the member stack devices for other reasons not related to the configuration of the stack while remaining within the scope of the present disclosure as well.

In the illustrated embodiment, a management device 212 is coupled to the stack device 204 via the management network 210 and its connection to the management port on the stack device 204. The management device 212 may be provided by the IHS 100 discussed above with reference to FIG. 1 and/or include some or all of the components of the IHS 100, and in specific examples may be provided by a desktop computing device, a laptop/network computing device, a tablet computing device, a mobile phone, and/or any other management device that would be apparent to one of skill in the art in possession of the present disclosure. However, while the management device 212 is illustrated as coupled to the stack device 204 via the management network 210, the direct connection of the management device 212 to the stack device 204 (e.g., via cabling) will fall within the scope of the present disclosure as well. While a specific single management connection automatic device stack configuration system 200 is illustrated and described herein, one of skill in the art in possession of the present disclosure will recognize that automatic device stack configuration systems may include a variety of components and/or component configurations while operating according to the teachings of the present disclosure.

Figure 3:
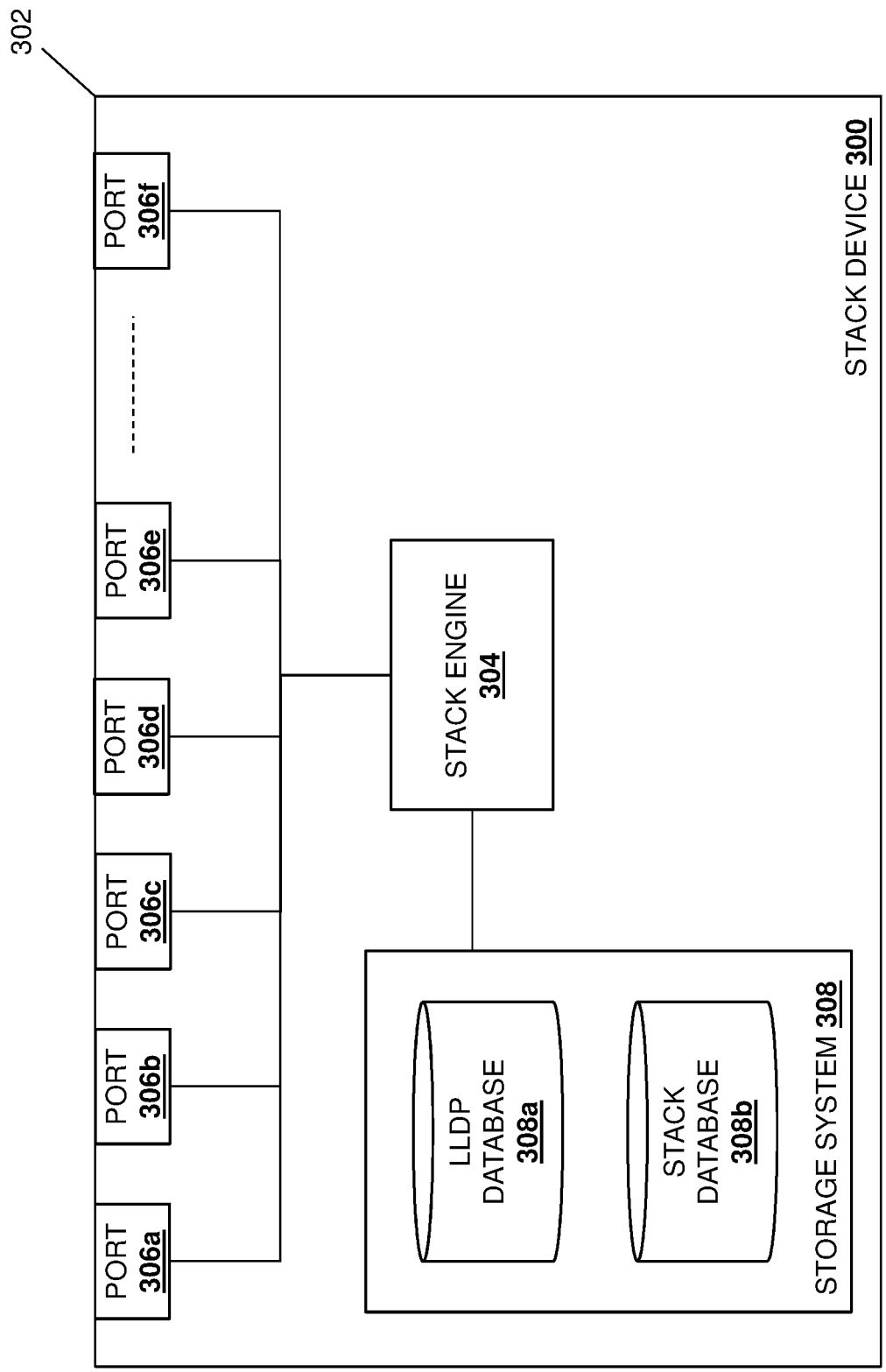
FIG. 3 is a schematic view illustrating an embodiment of a stack device that may be provided in the single management connection automatic device stack configuration system of FIG. 2.

Referring now to FIG. 3, an embodiment of a stack device 300 is illustrated that may provide any of the stack devices 202-208 discussed above with reference to FIG. 2. As such, the stack device 300 may be provided by the IHS 100 discussed above with reference to FIG. 1 and/or include some or all of the components of the IHS 100, and in specific examples may be provided by networking devices such as switch devices, although other devices that can be stacked or otherwise configured to operate as a single logical entity may benefit from the teachings of the present disclosure and thus fall within its scope as well. In the illustrated embodiment, the stack device 300 includes a chassis 302 that houses the components of the stack device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a stack engine 304 that is configured to perform the functions of the stack engines and stack devices discussed below.

The chassis 302 may also includes a plurality of ports 306*a*, 306*b*, 306*c*, 306*d*, 306*e*, and up to 306*f*, each of which is coupled to the stack engine 304 (e.g., via a coupling between that port and the processing system), and any or all of which may be accessible via an outer surface of the chassis 302. The chassis 302 may also house a storage system 308 that is coupled to the stack engine 304 (e.g., via a coupling between the storage system 308 and the processing system) and that includes a port/address database that, in the illustrated embodiment, is provided by a Link Layer Discovery Protocol (LLDP) database 308*a* that is configured to store information received via LLDP packets exchanged between stack devices, as well as any of the other information utilized by the stack engine 304 as discussed below. In addition, the storage system 308 also includes a stack database 308*b* that is configured to store information maintained by a master stack device about member stack devices, as well as any of the other information utilized by the stack engine 304 as discussed below. As will be understood by one of skill in the art in possession of the present disclosure, the stack database 308*b* may only be provided in the stack device 300 when the stack device 300 provides a master stack device, and may be omitted from the stack device 300 when the stack device 300 provides a member stack device. While a specific stack device 300 has been described, one of skill in the art in possession of the present disclosure will recognize that stack devices may include a variety of components and/or component configurations for performing conventional stack device functionality (e.g., switch device functionality), as well as the functionality discussed below, while remaining within the scope of the present disclosure.

Figure 4A:
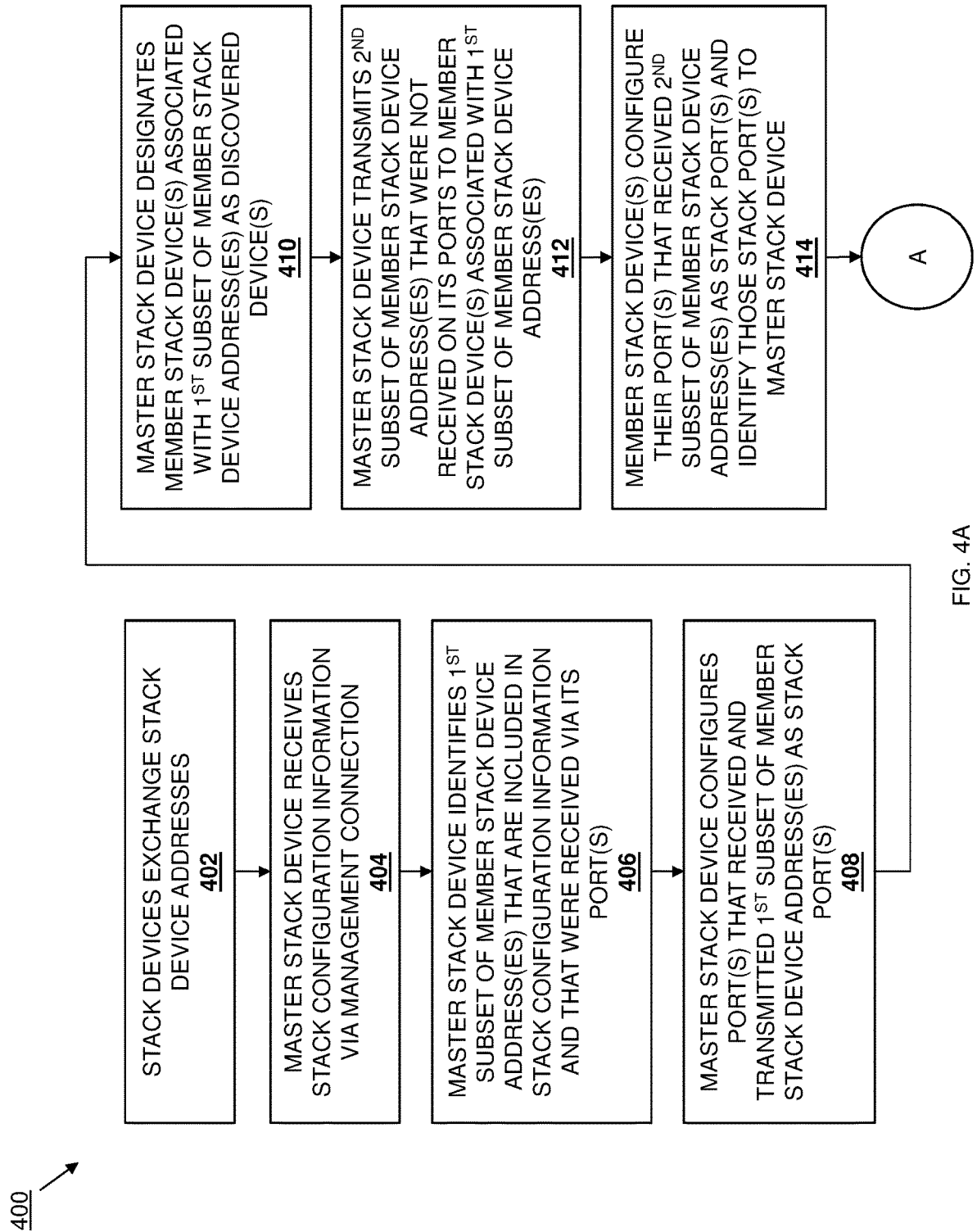
FIG. 4A is a flow chart illustrating an embodiment of a portion of a method for automatically configuring a device stack via a single management connection.

Referring now to FIGS. 4A and 4B, an embodiment of a method 400 for automatically configuring a device stack via a single management connection is illustrated. As discussed below, the systems and methods of the present disclosure provide for the ability to configure a stack, which includes a master stack device and member stack device(s), via a single management connection to the master stack device and without the need to provide stack configuration information on the member stack device(s). For example, the master stack device may be provided stack configuration information that includes the known member stack device address(es) for the member stack device(s) that are to be included in a stack, and the master stack device may identify a first subset of those member stack device address(es) that were received via its ports during an exchange of stack device addresses (e.g., via Link Layer Discovery Protocol (LLDP) packets exchanged by the stack devices.) The master stack device may then configure each of its port(s) that received the first subset of member stack device address(es) as stack port(s). The master stack device may also transmit a second subset of the member stack device address(es) that were not received via its ports during the exchange of stack device addresses to each of the member stack device(s) associated with the first subset of member stack device address(es).

Each of the member stack device(s) that receives the second subset of the member stack device address(es) may then determine whether any of those second subset of member stack device address(es) were received via its ports during the exchange of stack device address(es) and, if so, configure those ports as stack ports and transmit an identification of those stack ports to the master stack device. The master stack device will then designate those member stack device(s) as discovered devices and identify their stack ports in a database. This member stack device and stack port discovery process may continue (which each member stack device forwarding subsets of the member stack device address(es) that were not received on its ports) until each of the member stack device address(es) received in the stack configuration information is associated with a designated stack device (by the master stack device) and includes at least one port configured as a stack port. The member stack device and stack port discovery process may terminate in a variety of different manners (discussed below) depending on the configuration and number of stack devices in the stack. As such, stacks may be configured from stack devices using only a single management connection to the stack device that is to provide the master stack device in the stack, and without the need for any management connections to, or stack configuration information provisioning on, the stack devices that are to provide the member stack device(s) in the stack.

The method 400 begins at block 402 where stack devices exchange stack device addresses. In an embodiment, at block 402, the stack devices 202, 204, 206, and 208 may transmit their stack device address to any directly connected devices. For example, at block 402, an LLDP protocol component of the stack engine 304 in each stack device 202-208 may generate Link Layer Discovery Protocol (LLDP) packets that include the Media Access Control (MAC) address of that stack device, and then transmit that LLDP packet to its directly connected devices. As such, at block 402, the stack engine 304 in the stack device 202 may transmit the MAC address of the stack device 202 to the stack device 204 and the stack device 208, the stack engine 304 in the stack device 204 may transmit the MAC address of the stack device 204 to the stack device 206 and the stack device 202, the stack engine 304 in the stack device 206 may transmit the MAC address of the stack device 206 to the stack device 208 and the stack device 204, and the stack engine 304 in the stack device 208 may transmit the MAC address of the stack device 208 to the stack device 202 and the stack device 206. As such, the stack engine 304 in each of the stack devices 202-208 may receive the MAC addresses transmitted by its directly connected devices as discussed above, and may store those MAC addresses in its respective LLDP database 308a. However, while a specific technique for exchanging member stack device addresses has been described, one of skill in the art in possession of the present disclosure will recognize that device addresses may be exchanged in a variety of manners that will fall within the scope of the present disclosure as well.

The method 400 then proceeds to block 404 where a master stack device receives stack configuration information via a management connection. In an embodiment, at block 404, a network administrator or other user may wish to create a stack from the stack devices 202-208 and, in response, designate the stack device 204 as a master stack device (hereinafter, the "master stack device 204") and the stack devices 202, 206, and 208 as member stack devices ("hereinafter, the "member stack device 202", "member stack device 206", and "member stack device 208"), and connect to the master stack device 204 using the management device 212 via a management connection (provided by the management network 210 in FIG. 2 and a management port (e.g., port 306a) on the master stack device 204). For example, the designation of the stack device 204 as the master stack device 204 may occur in response to the master stack device 204 already having the management connection to the management device 212 via the management network 210, in response to the provisioning of the management connection to the stack device 204 via a direct cabled connection to the management device 212, and/or in response to a variety of other factors that would be apparent to one of skill in the art in possession of the present disclosure. However, while a particular stack device 204 in the stack devices 202-208 is illustrated and described as being selected as the master stack device, one of skill in the art in possession of the present disclosure will recognize that any of the stack devices 202-208 may be selected as the master stack device while remaining within the scope of the present disclosure as well.

At block 404, the network administrator and/or other user of the management device 212 may generate stack configuration information that includes member stack device addresses for each of the member stack devices 202, 206, and 208, and provide that stack configuration information through the management connection (e.g., provided by the management network 212, provided by a direct cabled connection, etc.) to the master stack device 204. For example, the network administrator and/or other user may determine the MAC addresses of the master stack device 204 and the member stack devices 202, 206, and 208 in a variety of manners that would be apparent to one of skill in the art in possession of the present disclosure, and provide those MAC addresses along with stack device identifiers in a Command Line Interface (CLI) command (or using a stack configuration file) that is configured to assign each of those stack device identifiers to a respective one of those MAC addresses. One of skill in the art in possession of the present disclosure will recognize that such a CLI command may be provided to ensure that the stack port configurations discussed below are applied on particular stack devices while forcing stacking algorithms to use the provided stack device identifiers, rather than allocating different stack device identifiers that are determined at stack configuration time and that may result in an undesired stack configuration. However, while a specific technique for providing the stack configuration information of the present disclosure has been described, one of skill in the art in possession of the present disclosure will recognize that any of a variety of techniques may be utilized to provide that stack configuration information while remaining within the scope of the present disclosure as well.

Figure 5:
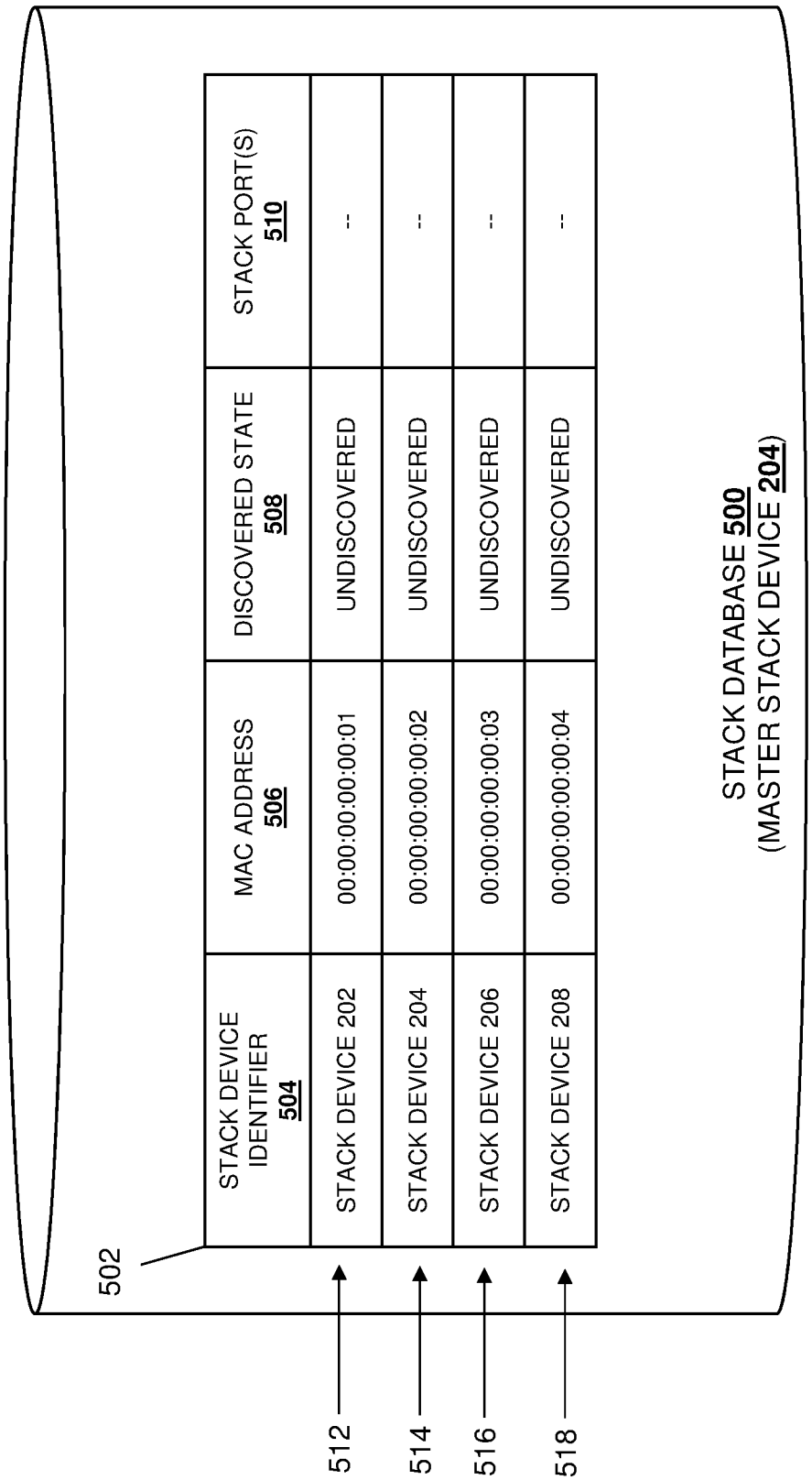
FIG. 5 is a schematic view illustrating an embodiment of a stacking database provided in a master stack device included in the single management connection automatic device stack configuration system of FIG. 2 during the method of FIG. 4.

As such, at block 404, the stack engine 304 in the master stack device 204 may receive the stack configuration information via the management connection and through its management port (e.g., the port 306a). In response to receiving the stack configuration information, the stack engine 304 may operate to store that stack configuration information in the stack database 308b. For example, FIG. 5 illustrates a stack database 500 for the master stack device 204 that includes a stack device table 502 having a stack unit identifier column 504 that may be provided with stack device identifiers that identify stack devices, a MAC address column 506 that may be provided with MAC addresses for an associated stack device, a discovered state column 508 that may be provided with a discovered state of an associated stack device, and a stack port(s) column 510 that may be provided with stack port identifiers for stack ports on an associated stack device. In the illustrated example, the stack configuration information received by the stack engine 304 in the master stack device 204 included stack identifiers for the stack devices 202-208 and their associated MAC addresses and, as such, a first row 512 in the stack device table 502 includes "stack device 202" in the stack device identifier column 504, "00:00:00:00:00:01" (i.e., the MAC address of the stack device 202) in the MAC address column 506, "undiscovered" in the discovered state column 508, and no information in the stack port(s) column.

Similarly, a second row 514 in the stack device table 502 includes "stack device 204" in the stack device identifier column 504, "00:00:00:00:00:02" (i.e., the MAC address of the stack device 204) in the MAC address column 506, "undiscovered" in the discovered state column 508, and no information in the stack port(s) column; a third row 516 in the stack device table 502 includes "stack device 206" in the stack device identifier column 504, "00:00:00:00:00:03" (i.e., the MAC address of the stack device 206) in the MAC address column 506, "undiscovered" in the discovered state column 508, and no information in the stack port(s) column; and a fourth row 218 in the stack device table 502 includes "stack device 208" in the stack device identifier column 504, "00:00:00:00:00:04" (i.e., the MAC address of the stack device 208) in the MAC address column 506, "undiscovered" in the discovered state column 508, and no information in the stack port(s) column. As discussed below, the "undiscovered" entries in the discovered state column 508 may be default entries that exist prior to the configuration of a stack including the master stack device 204 and the member stack devices 202, 206, and 208, and the stack port(s) column 510 may remain empty until stack ports are identified during that stack configuration.

Figure 6:
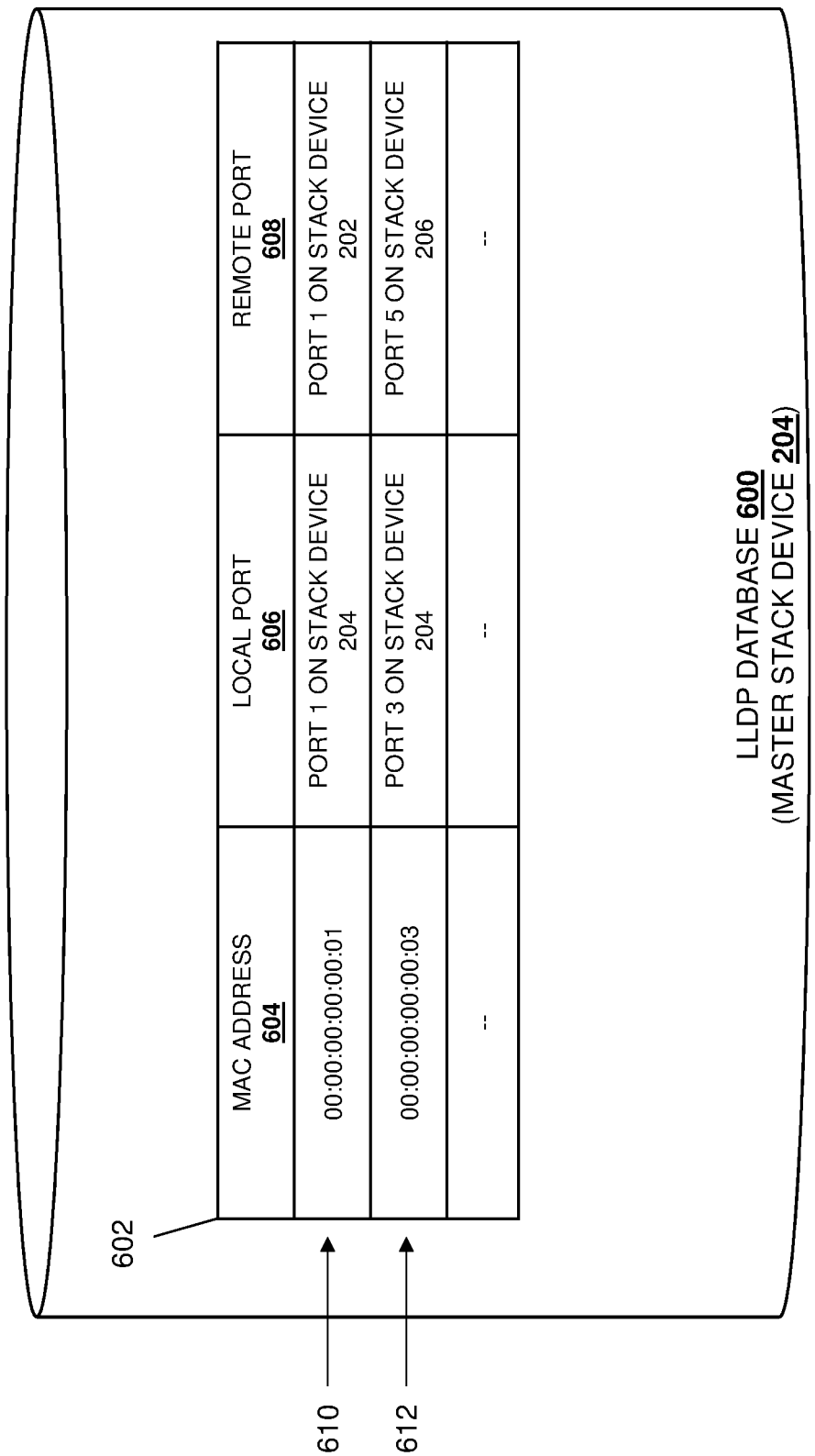
FIG. 6 is a schematic view illustrating an embodiment of an Link Layer Discovery Protocol (LLDP) database provided in a master stack device included in the single management connection automatic device stack configuration system of FIG. 2 during the method of FIG. 4.

The method 400 then proceeds to block 406 where the master stack device identifies a first subset of member stack device address(es) that are included in the stack configuration information and that were received via its ports. In an embodiment, at block 406, the stack engine 304 in the master stack device 204 may operate to identify, in its port/address database, a first subset of the member stack addresses that were included in the stack configuration information. As discussed above, the port/address database may be populated by the master stack device 204 during the exchange of stack device addresses that was conducted at block 402. For example, FIG. 6 illustrates an LLDP database 600 for the master stack device 204 that includes an LLDP information table 602 having a MAC address column 604 that may be provided with MAC addresses that were received In LLDP communications on ports included in the master stack device 204, a local port column 606 that may be provided with a port/stack device identifier that identifies the port on the master stack device 204 that received an associated MAC address, and a remote port column 608 that may be provided with a port/stack device identifier that identifies the port on the member stack device that transmitted the associated MAC address.

In the illustrated example, the LLDP information table 602 includes a first row 610 including "00:00:00:00:00:01" (i.e., the MAC address of the member stack device 202) in the MAC address column 604, identifies that that MAC address was received on port 1 of the master stack device 204 in the local port column 606, and identifies that that MAC address was transmitted via port 1 of the member stack device 202 in the remote port column 608. Similarly, the LLDP information table 602 includes a second row 612 including "00:00:00:00:00:03" (i.e., the MAC address of the member stack device 206) in the MAC address column 604, identifies that that MAC address was received on port 3 of the master stack device 204 in the local port column 606, and identifies that that MAC address was transmitted via port 5 of the member stack device 206 in the remote port column 608. As such, at block 406, the stack engine 304 in the master stack device 204 may identify that the MAC addresses of the member stack device 202 (e.g., "00:00:00: 00:00:01" in this example) and the member stack device 206 (e.g., "00:00:00:00:00:03" in this example) that were provided in the stack configuration information (and are included in the stack database 500 for the master stack device 204 as illustrated in FIG. 5) were received via its ports (e.g., port 1 and port 3, respectively, as illustrated in the LLDP database 600 illustrated in FIG. 6) at block 402.

The method 400 then proceeds to block 408 where the master stack device configures ports that received the first subset of member stack device address(es) as stack port(s), and causes ports that transmitted the first subset of member stack devices address(es) as stack port(s). In an embodiment, at block 408, the stack engine 304 in the master stack device 204 may operate to configure its ports that received the member stack device addresses at block 402 as stack ports, as well as cause the member stack devices that transmitted those member stack device addresses at block 402 to configure their ports used to transmit those member stack device addresses as stack ports. As such, continuing with the example above, the stack engine 304 in the master stack device 204 may cause the member stack device 202 to configure its port 1 that was used to transmit the MAC address of the member stack device 202 (e.g., "00:00:00: 00:00:01" in this example), may configured port 1 on the master stack device 204 that received the MAC address of the member stack device 202 (e.g., "00:00:00:00:00:01" in this example), may cause the member stack device 206 to configure its port 5 that was used to transmit the MAC address of the member stack device 206 (e.g., "00:00:00: 00:00:03" in this example), and may configure port 3 on the master stack device 204 that received the MAC address of the member stack device 206 (e.g., "00:00:00:00:00:03" in this example), as stack ports. While not described herein in detail, one of skill in the art in possession of the present disclosure will recognize that ports may be configured as stack ports in a variety of manners that will fall within the scope of the present disclosure.

Figure 7:
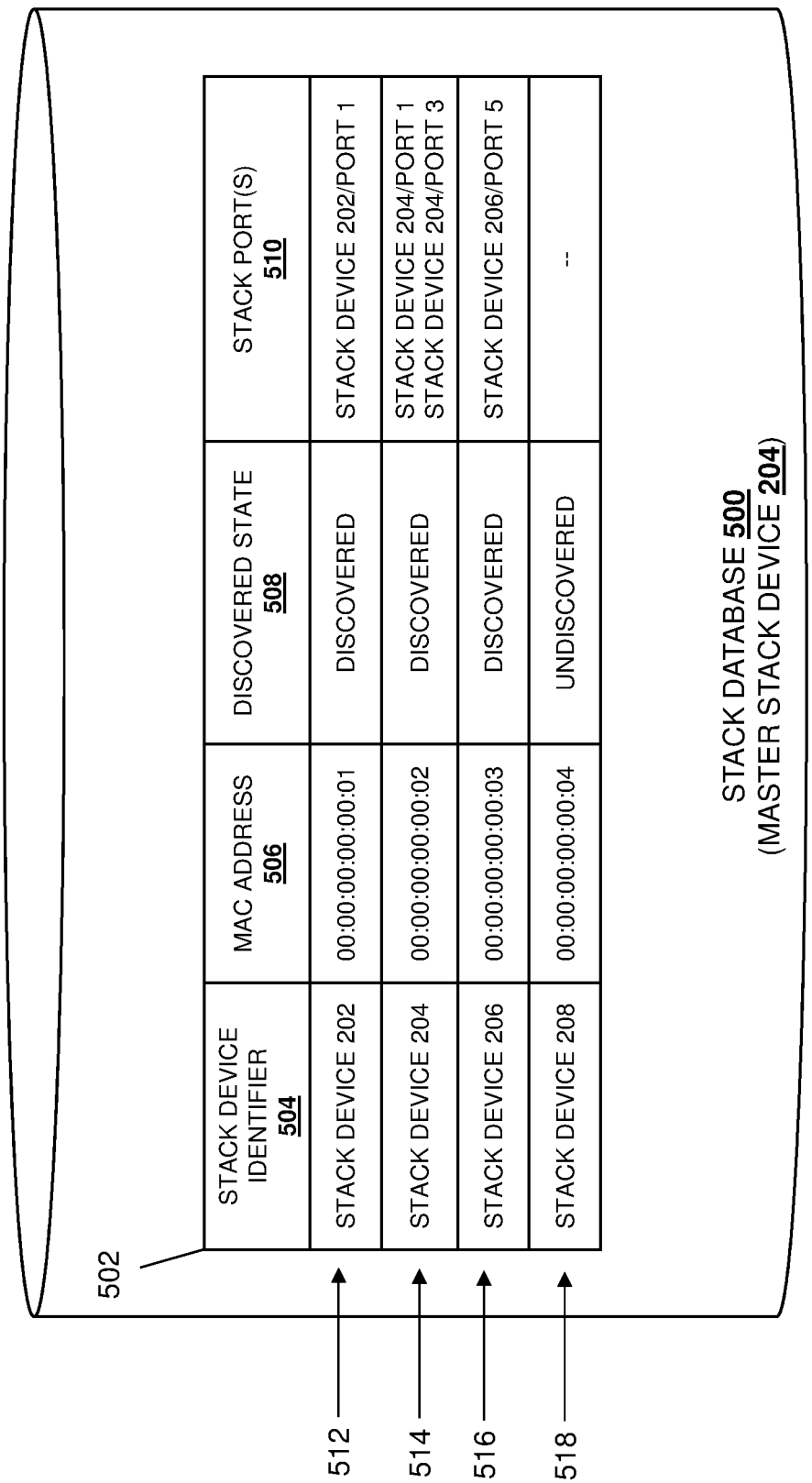
FIG. 7 is a schematic view illustrating an embodiment of the stacking database provided in a master stack device included in the single management connection automatic device stack configuration system of FIG. 2 during the method of FIG. 4.

The method 400 then proceeds to block 410 where the master stack device designates member stack device(s) associated with the first subset of member stack device address(es) as discovered device(s). In an embodiment, at block 410, the stack engine 304 in the master stack device 204 may operate to designate each of the member stack devices 202 and 206 from which the MAC addresses were received at block 402 as discovered devices. For example, FIG. 7 illustrates the stack database 500 of the master stack device 204 with the discovered state column 508 and the stack port(s) column 510 updated following blocks 408 and 410. As can be seen, the first row 512 of the stack device table 502 now provides the member stack device 202 as "discovered" in the discovered state column 508, with port 1 on the member stack device 202 (i.e., the port that transmitted the MAC address ("00:00:00:00:00:01") of the member stack device 202 to the master stack device 204) designated as a stack port in the stack port(s) column 510.

Similarly, the second row 514 of the stack device table 502 now provides the master stack device 204 as "discovered" in the discovered state column 508, with port 2 on the master stack device 204 (i.e., the port that received the MAC address ("00:00:00:00:00:01") of the member stack device 202) and port 3 on the master stack device 204 (i.e., the port that received the MAC address ("00:00:00:00:00:03") of the member stack device 206) designated as a stack port in the stack port(s) column 510; the third row 516 of the stack device table 502 now provides the member stack device 206 as "discovered" in the discovered state column 508, with port 5 on the member stack device 206 (i.e., the port that transmitted the MAC address ("00:00:00:00:00:03") of the member stack device 206 to the master stack device 204) designated as a stack port in the stack port(s) column 510; and the fourth row 518 continuing to designate the stack device 208 as undiscovered.

The method 400 then proceeds to block 412 where the master stack device transmits a second subset of member stack device address(es) that were not received on its ports to member stack device(s) associated with the first subset of member stack device address(es). In an embodiment, at block 412, the stack engine 304 in the master stack device 204 may operate to transmit member stack device addresses that were not received on its ports at block 402 to the member stack devices associated with the member stack device addresses that were received on its ports at block 402. Continuing with the example above, with reference to FIG. 7, the MAC address "00:00:00:00:00:02" belongs to the master stack device 204, and the member stack device addresses "00:00:00:00:00:01" and "00:00:00:00:00:03" were received on the ports of the master stack device 204 from the member stack devices 202 and 206, respectively. at block 402. As such, at block 412 the stack engine 304 in the master stack device 204 may transmit the member stack device address "00:00:00:00:00:04" to each of the member stack devices 202 and 206 (e.g., because it is the only member stack device address that wasn't received on a port of the master stack device at block 402). For example, at block 412 the stack engine 304 in the master stack device 204 may generate an LLDP communication having a Type-Length-Value (TLV) structure that includes the member stack device address "00:00:00:00:00:04", and provide that LLDP communication to each of the member stack devices 202 and 206. While a specific technique for transmitting the member stack device address of the undiscovered member stack device has been described, one of skill in the art in possession of the present disclosure will recognize that member stack device addresses may be transmitted in a variety of manners that will fall within the scope of the present disclosure as well.

Figure 8:
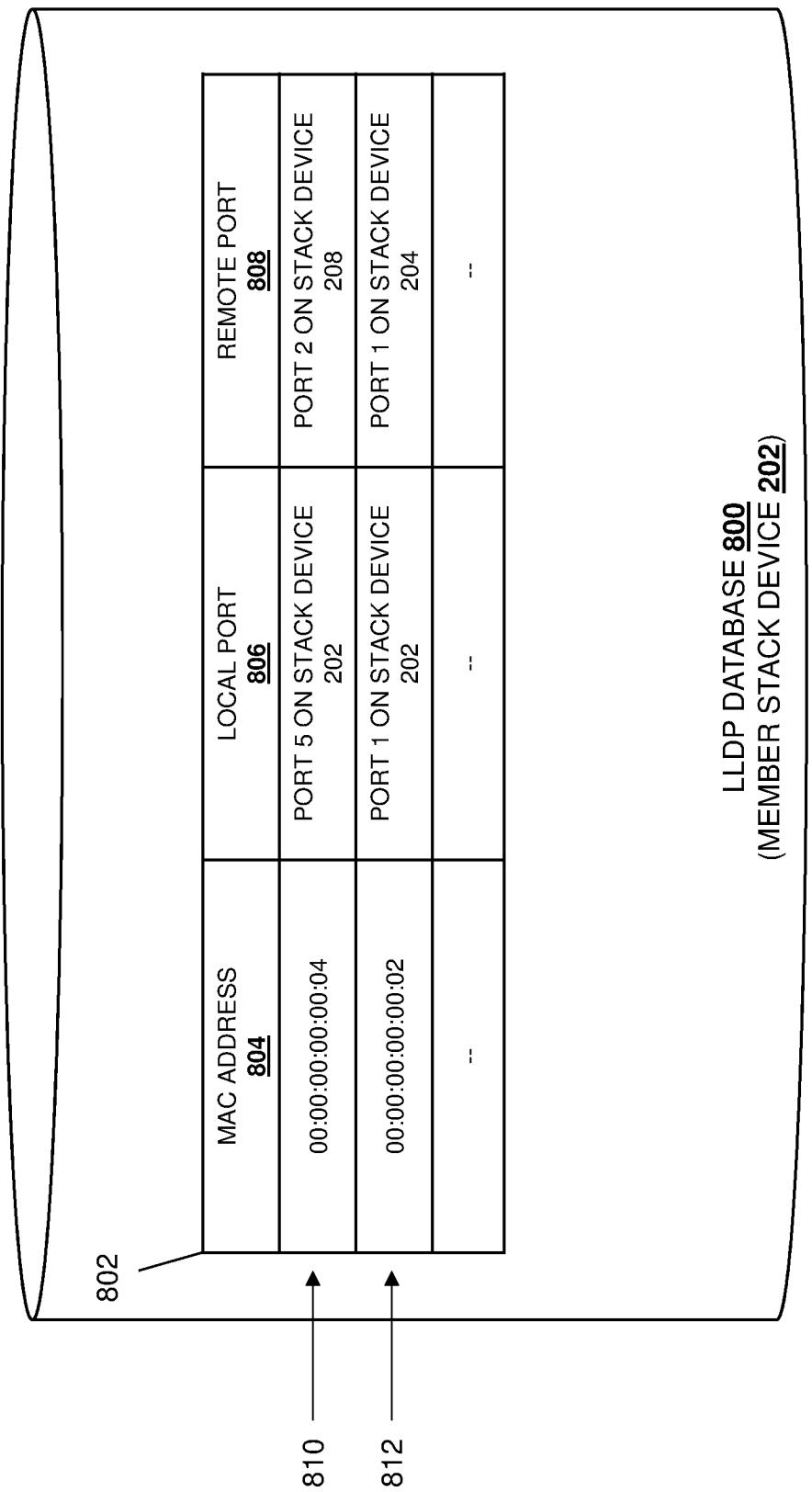
FIG. 8 is a schematic view illustrating an embodiment of a Link Layer Discovery Protocol (LLDP) database provided in a first member stack device included in the single management connection automatic device stack configuration system of FIG. 2 during the method of FIG. 4.

The method 400 then proceeds to block 414 where the member stack device(s) configure their port(s) that received the second subset of member stack device address(es) as stack port(s) and identify those stack port(s) to the master stack device. In an embodiment, at block 414, the stack engines 304 in the member stack devices 202 and 206 each identify any of the second subset of member stack device address(es) that were received via their ports. As discussed above, the port/address databases may be populated by the member stack devices 202 and 206 during the exchange of stack device addresses that was conducted at block 402. For example, FIG. 8 illustrates an LLDP database 800 for the member stack device 202 that includes an LLDP information table 802 having a MAC address column 804 that may be provided with MAC addresses that were received on ports included in the member stack device 202, a local port column 806 that may be provided with a port/stack device identifier that identifies the port on the member stack device 202 that received an associated MAC address, and a remote port column 808 that may be provided with a port/stack device identifier that identifies the port on the member stack device or master stack device that transmitted the associated MAC address.

In the illustrated example, the LLDP information table 802 includes a first row 810 including "00:00:00:00:00:04" (i.e., the MAC address of the member stack device 208) in the MAC address column 804, identifies that that MAC address was received on port 5 of the member stack device 202 in the local port column 806, and identifies that that MAC address was transmitted via port 2 of the member stack device 208 in the remote port column 808. Similarly, the LLDP information table 802 includes a second row 812 including "00:00:00:00:00:02" (i.e., the MAC address of the master stack device 204) in the MAC address column 804, identifies that that MAC address was received on port 1 of the member stack device 202 in the local port column 806, and identifies that that MAC address was transmitted via port 1 of the master stack device 204 in the remote port column 808. As such, at block 414, the stack engine 304 in the member stack device 202 may identify that the MAC address of the member stack device 208 (e.g., "00:00:00:00:00:04" in this example) that was provided in the stack configuration information (and is included in the stack database 500 for the master stack device 204 as illustrated in FIG. 5) was received via its port (e.g., port 5, as illustrated in the LLDP database 800 illustrated in FIG. 8). In response to identifying that the MAC address of the member stack device 208 was received via its port (e.g., port 5), the stack engine 304 in the stack device 202 may configure that port as a stack port, and identify that stack port as well as the port on the member stack device 208 that transmitted that MAC address at block 402 (e.g., port 2), to the master stack device 204 (e.g., via a TLV structure in an LLDP communication, similarly as discussed above). In the event the identification of the stack ports by a member stack device is received by another member stack device (and not the master stack device), the member stack device receiving that identification will forward it out of each of its stack port that did not receive that identification.

Figure 9:
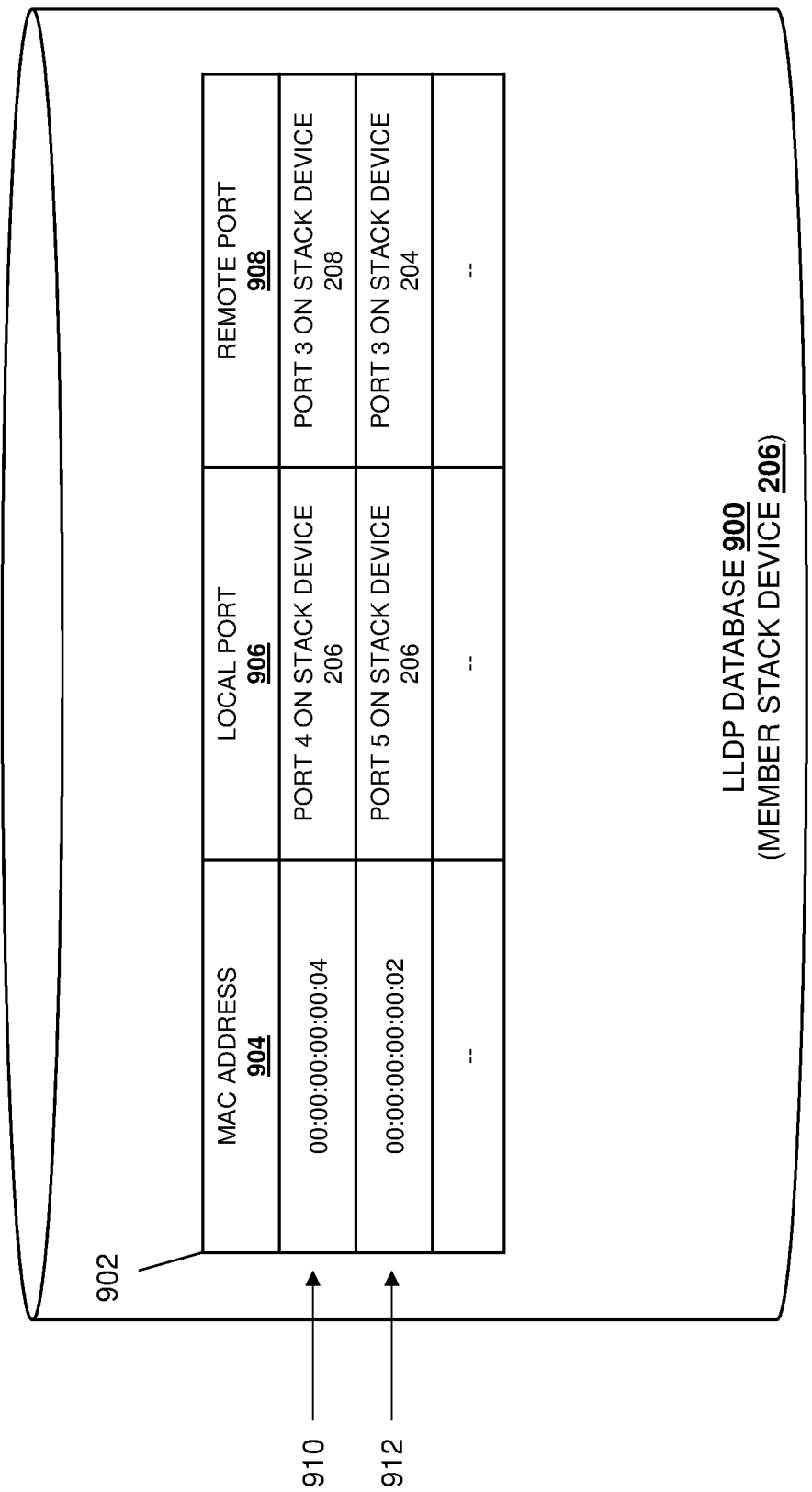
FIG. 9 is a schematic view illustrating an embodiment of an LLDP database provided in a second member stack device included in the single management connection automatic device stack configuration system of FIG. 2 during the method of FIG. 4.

Similarly, FIG. 9 illustrates an LLDP database 900 for the member stack device 206 that includes an LLDP information table 902 having a MAC address column 904 that may be provided with MAC addresses that were received on ports included in the member stack device 206, a local port column 906 that may be provided with a port/stack device identifier that identifies the port on the member stack device 206 that received an associated MAC address, and a remote port column 908 that may be provided with a port/stack device identifier that identifies the port on the member stack device or master stack device that transmitted the associated MAC address.

In the illustrated example, the LLDP information table 902 includes a first row 910 including "00:00:00:00:00:04" (i.e., the MAC address of the member stack device 208) in the MAC address column 904, identifies that that MAC address was received on port 4 of the member stack device 206 in the local port column 906, and identifies that that MAC address was transmitted via port 3 of the member stack device 208 in the remote port column 908. Similarly, the LLDP information table 902 includes a second row 912 including "00:00:00:00:00:02" (i.e., the MAC address of the master stack device 204) in the MAC address column 904, identifies that that MAC address was received on port 5 of the member stack device 206 in the local port column 906, and identifies that that MAC address was transmitted via port 3 of the master stack device 204 in the remote port column 908. As such, at block 414, the stack engine 304 in the member stack device 206 may identify that the MAC addresses of the member stack device 208 (e.g., "00:00:00:00:00:04" in this example) that was provided in the stack configuration information (and is included in the stack database 500 for the master stack device 204 as illustrated in FIG. 5) was received via its port (e.g., port 4, as illustrated in the LLDP database 900 illustrated in FIG. 9). In response to identifying that the MAC address of the member stack device 208 was received via its port (e.g., port 4), the stack engine 304 in the stack device 206 may configure that port as a stack port, and identify that stack port, as well as the port on the member stack device 208 that transmitted that MAC address at block 402 (e.g., port 3), to the master stack device 204 (e.g., via a TLV structure in an LLDP communication, similarly as discussed above). Similarly as above, in the event the identification of the stack ports by a member stack device is received by another member stack device (and not the master stack device), the member stack device receiving that identification will forward it out of each of its stack port that did not receive that identification.

Figure 10:
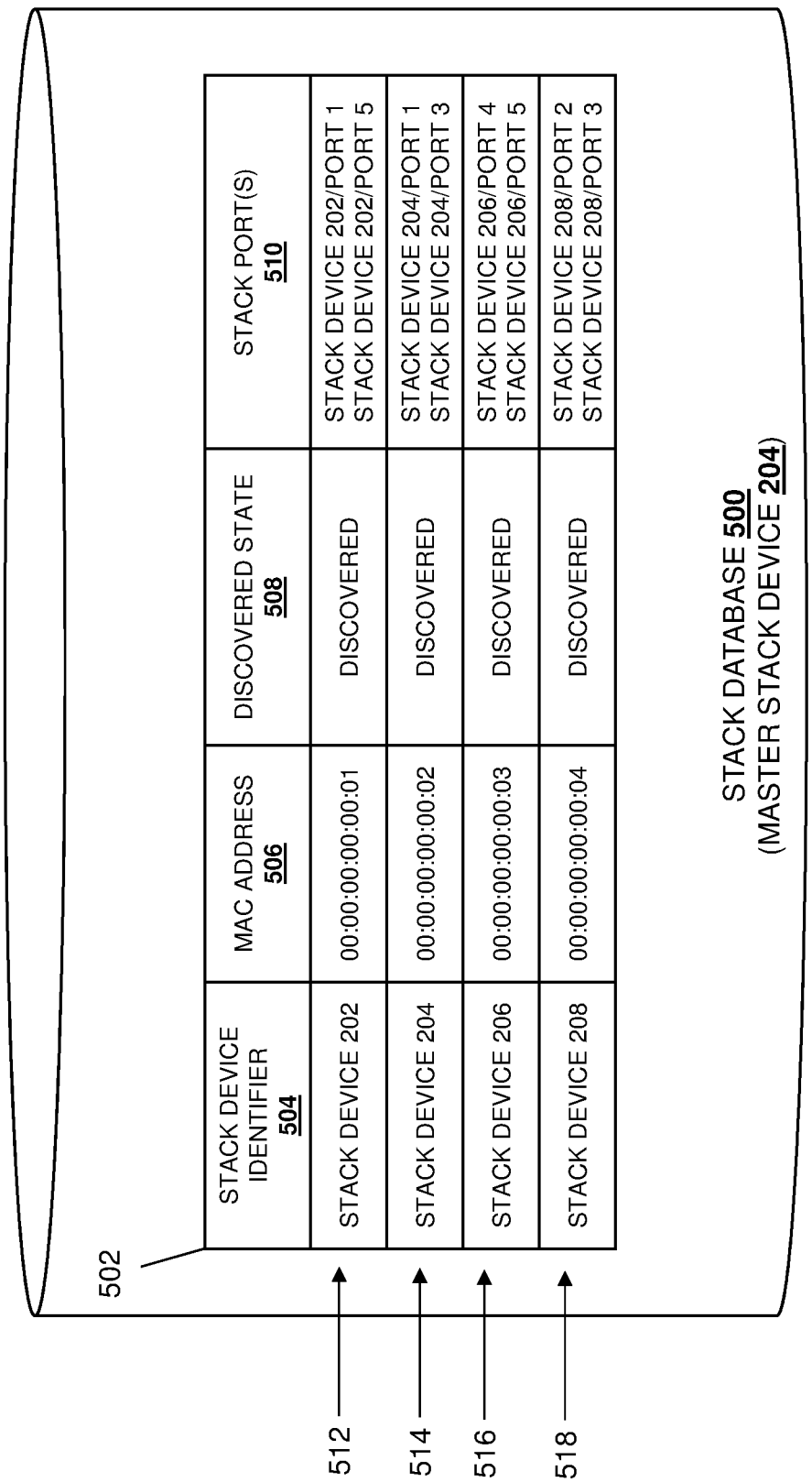
FIG. 10 is a schematic view illustrating an embodiment of a stacking database provided in a master stack device included in the single management connection automatic device stack configuration system of FIG. 2 during the method of FIG. 4.

The method 400 then proceeds to block 416 where the master stack device designates member stack device(s) associated with the second subset of member stack device address(es) as discovered device(s). In an embodiment, at block 416, the stack engine 304 in the master stack device 204 may operate to designate the member stack device 208 as a discovered device. For example, FIG. 10 illustrates the stack database 500 of the master stack device 204 with the discovered state column 508 and the stack port(s) column 510 updated following block 414. As can be seen, the fourth row 512 of the stack device table 502 now provides the member stack device 208 as "discovered" in the discovered state column 508, with port 2 on the member stack device 208 (i.e., the port that transmitted the MAC address ("00:00:00:00:00:04") of the member stack device 208 to the member stack device 202), and port 3 on the member stack device 208 (i.e., the port that transmitted the MAC address ("00:00:00:00:00:04") of the member stack device 208 to the member stack device 206) designated as stack ports in the stack port(s) column 510.

The method 400 then proceeds to block 418 where the master stack device determines that all member stack device address(es) in the stack configuration information are associated with discovered devices. In an embodiment, at block 418, the stack engine 304 in the master stack device 204 may recognize from the stack database 500 of the master stack device 204 illustrated in FIG. 10 that all of the stack device identifiers and their associated MAC addresses are now associated with discovered devices. As discussed above, the stack device and stack port discovery process may terminate in a variety of different manners depending on the configuration and number of stack devices in the stack. For example, when an even number of stack devices provide the stack in a ring configuration as illustrated in FIG. 2, the determination that all the member stack device address(es) in the stack configuration information are associated with discovered devices is performed at block 418, followed by optional block 420 below where the final discovered device in the stack configures its stack ports. However, as discussed below, the termination of the stack device and stack port discovery process differs depend on the configuration of the stack devices, the number of stack devices in a stack, and/or other factors that would be apparent to one of skill in the art in possession of the present disclosure.

The method 400 then proceeds to optional block 420 where the master stack device causes any member stack device(s) that do not have a stack port to configure a port on that member stack device as a stack port. As discussed above, when an even number of stack devices are provided in a ring configuration, optional block 420 follows the determination that all stack devices have been discovered, and the master stack device 204 causes a member stack device to configure one or more of their ports as stack ports. For example, in the embodiment discussed above in which the four stack devices 202, 204, 206, and 208 are provided in a ring configuration, following block 418 the member stack device 208 includes ports that are connected to the member stack devices 202 and 206, respectively, that need to be configured as stack ports. As such, in such embodiments, at block 420 the stack engine 304 may instruct the member stack device 208 (e.g., via the member stack devices 202 and/or 206) to configure its ports (e.g., ports 2 and 3 in this example) as stack ports. For example, such instruction may be provided by the stack engine 304 in the master stack device via a TLV structure in an LLDP communication similar to those discussed above, but having no MAC addresses for performing stack device discovery. In response to receiving the instruction, the stack engine 204 in the member stack device 208 may configure those ports as stack ports.

Figure 11:
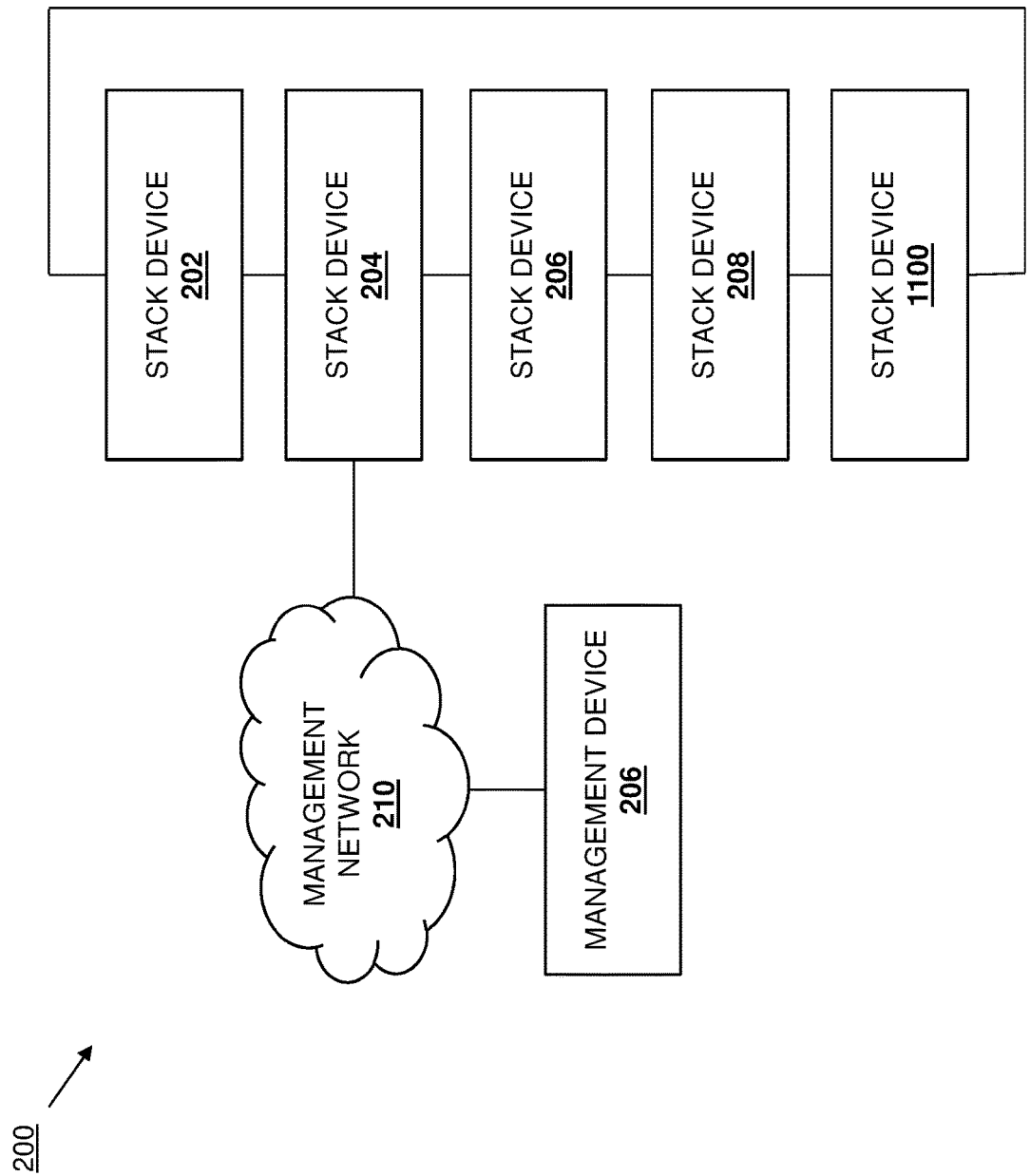
FIG. 11 is a schematic view illustrating an alternate embodiment of a single management connection automatic device stack configuration system.

With reference to FIG. 11, the single management connection automatic device stack configuration system 200 is illustrated with an odd number of stack devices (e.g., the stack devices 202-208 discussed above, with the addition of a stack device 1100 connected between the stack devices 202 and 208) that are provided in a ring configuration. As would be appreciated by one of skill in the art in possession of the present disclosure, the method 400 may operate in substantially the same manners as discussed above, with the master stack device 204 first discovering the member stack devices 202 and 206, followed by the member stack device 202 discovering member stack device 1100 (and reporting that to the master stack device 204) and the member stack device 206 discovering the member stack device 208 (and reporting that to the master stack device 204). Subsequently, the master stack device 204 will determine that all of the member stack device addresses received in the stack configuration information at block 402 are associated with discovered devices, but the link between the member stack device 208 and the member stack device 1100 will not have been discovered yet. As such, the master stack device 204 will send the MAC address of the member stack device 1100 to the member stack device 208, and send the MAC address of the member stack device 208 to the member stack device 1100. Each of the member stack device 208 and the member stack device 1100 will then determine via their LLDP databases that they are connected to each others ports, will configured those ports as stack ports, and identify those stack ports to the master stack device 204, which provides for the discovery of the link between the member stack device 208 and the member stack device 1100 (and the configuration of the ports connected to that link as stack ports) and allows the stack device and stack port discovery process to terminate.

Figure 12:
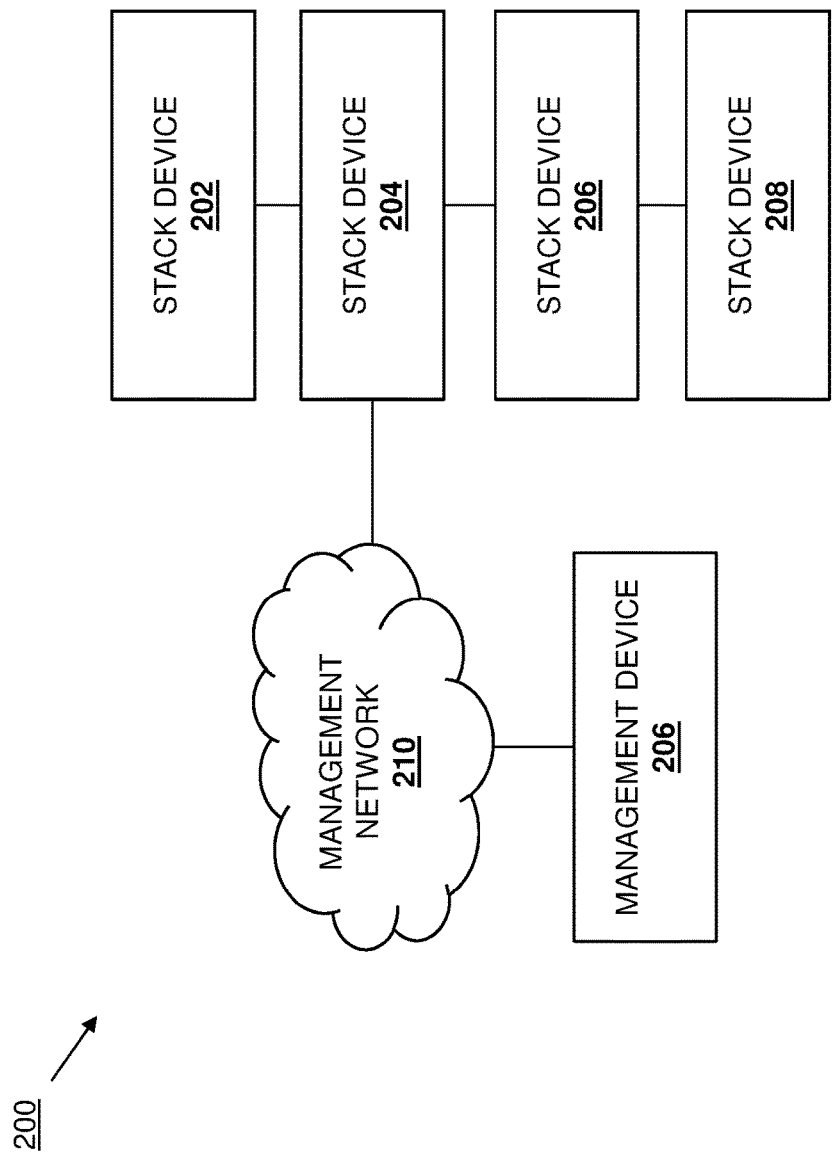
FIG. 12 is a schematic view illustrating an alternate embodiment of a single management connection automatic device stack configuration system.

With reference to FIG. 12, the single management connection automatic device stack configuration system 200 is illustrated with the even number of stack devices 202-208 provided in a daisy chain configuration (e.g., with the link between the stack device 202 and the stack device 208 illustrated in FIG. 2 omitted). As would be appreciated by one of skill in the art in possession of the present disclosure, the method 400 may operate in substantially the same manners as discussed above, with the master stack device 204 first discovering the member stack devices 202 and 206, followed by the member stack device 206 discovering the member stack device 208 (and reporting that to the master stack device 204). Subsequently, the master stack device 204 will determine that all of the member stack device addresses received in the stack configuration information at block 402 are associated with discovered devices, and may start a timer. If the master stack device 204 determines that neither of the member stack devices 202 and 208 has discovered each other within some time period, it will conclude that the stack is in a daisy chain configuration and the stack device and stack port discovery process terminates.

Figure 13:
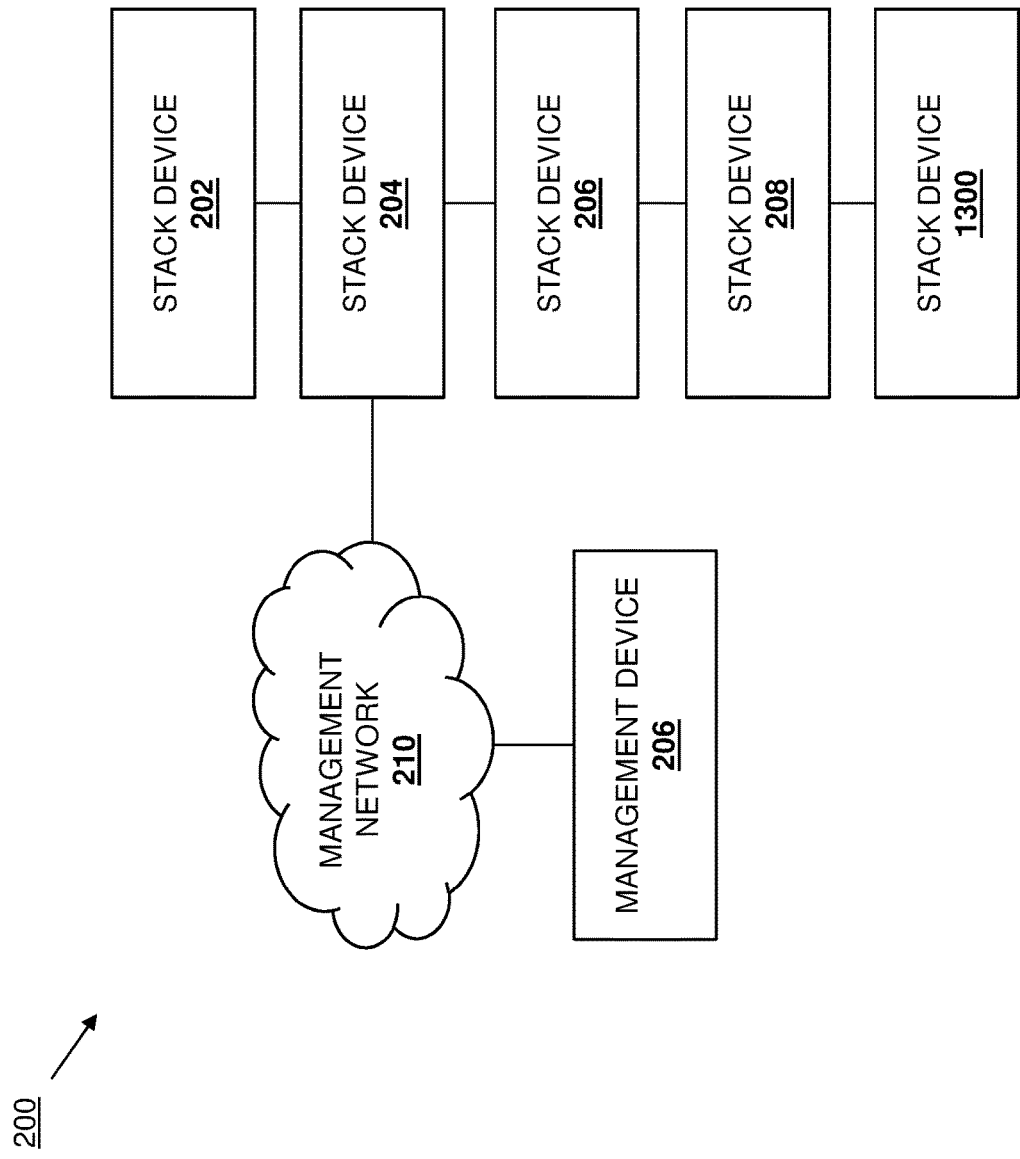
FIG. 13 is a schematic view illustrating an alternate embodiment of a single management connection automatic device stack configuration system.

With reference to FIG. 13, the single management connection automatic device stack configuration system 200 is illustrated with an odd number of stack devices (e.g., the stack devices 202-208 and a stack device 1300 connected to the stack device 208) provided in a daisy chain configuration (e.g., with no link between the stack device 202 and the stack device 1300). As would be appreciated by one of skill in the art in possession of the present disclosure, the method 400 may operate in substantially the same manners as discussed above, with the master stack device 204 first discovering the member stack devices 202 and 206, followed by the member stack device 206 discovering the member stack device 208 (and reporting that to the master stack device 204), followed by the member stack device 208 discovering the member stack device 1300 (and reporting that to the master stack device 204). Subsequently, the master stack device 204 will determine that all of the member stack device addresses received in the stack configuration information at block 402 are associated with discovered devices, and may start a timer. If the master stack device 204 determines that neither of the member stack devices 202 and 1300 has discovered each other within some time period, it will conclude that the stack is in a daisy chain configuration and the stack device and stack port discovery process terminates. While several examples have been illustrated and described, one of skill in the art in possession of the present disclosure will understand how the teachings of the present disclosure may be extended to provide for automatic device stack configuration via a single management connection for any number of stack devices.

Following any termination of the stack device and stack port discovery process, the method 400 then proceeds to block 422 where the master stack device reboots and causes a reboot of the member stack devices in order to provide a stack. In an embodiment, at block 422, the stack engine 304 in the master stack device 204 may generate and transmit a reboot instruction (e.g., in a TLV structure of an LLDP communication similarly as discussed above) to each of the member stack devices 202, 206, and 208, and may perform a reboot operation itself. In response to receiving the reboot instruction, the stack engine 304 in each of the member stack devices 202, 206, and 208 may perform reboot operations as well. In some embodiments, the reboot operations of the master stack device 204 and the member stack devices 202, 206, and 208 may be coordinated (e.g., via acknowledgements sent by the member stack devices 202, 206, and 208 in response to the reboot instructions) such that each of the master stack device 204 and the member stack devices 202, 206, and 208 performs the reboot operation at approximately the same time in order to allow each of the master stack device 204 and the member stack devices 202, 206, and 208 to initialize and operate as part of a stack. While not discussed in detail herein, one of skill in the art in possession of the present disclosure will recognize how the configuration of the stack ports in each of the master stack device 204 and the member stack devices 202, 206, and 208 discussed above, followed by the reboot operation, allows the master stack device 204 and the member stack devices 202, 206, and 208 to initialize as part of a stack that is configured to subsequently operate as a single logical entity, as discussed above.

Thus, systems and methods have been described that provide for the ability to configure a master stack device and member stack device(s) as a stack via a single management connection to the master stack device and without the need to provide stack configuration information on the member stack device(s). The master stack device may be provided stack configuration information that includes the known member stack device MAC address(es) for the member stack device(s) that are to be included in a stack, and the master stack device may identify a first subset of those member stack device MAC address(es) that were received via its ports during an exchange of LLDP packets by the stack devices. The master stack device may then configure each of its port(s) that received the first subset of member stack device MAC address(es) as stack port(s). The master stack device may also transmit a second subset of the member stack device MAC address(es) that were not received via its ports during the exchange of LLDP packets to each of the member stack device(s) associated with the first subset of member stack device MAC address(es). Each of the member stack device(s) that receives the second subset of the member stack device MAC address(es) may then determine whether any of those second subset of member stack device MAC address(es) were received via its ports during the exchange of LLDP packets and, if so, configure those ports as stack ports and transmit an identification of those stack ports to the master stack device. The master stack device will then designate those member stack device(s) as discovered devices and identify their stack ports in a database. This member stack device and stack port discovery process may continue (which each member stack device forwarding subsets of the member stack device MAC address(es) that were not received on its ports) until each of the member stack device MAC address(es) is associated with a designated stack device (by the master stack device) and includes at least one port configured as a stack port. The member stack device and stack port discovery process may terminate in a variety of different manners depending on the configuration and number of stack devices in the stack. As such, stacks may be configured from stack devices using only a single management connection to the stack device that is to provide the master stack device in the stack, and without the need for any management connections to, or stack configuration information provisioning on, the stack devices that are to provide the member stack device(s) in the stack.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automatic device stack configuration system, comprising:
   a management device;
   a plurality of member stack devices; and
   a master stack device that is coupled to the management device and the plurality of member stack devices, wherein the master stack device includes:
   a first processing system; and
   a first memory system that is coupled to the first processing system and that includes instructions that, when executed by the first processing system, cause the first processing system to provide a first stack engine that is configured to:

receive, from the management device, stack configuration information that includes a plurality of member stack device addresses;

identify, in a master stack device port/address database, a first subset of the plurality of member stack device addresses that were received via respective ports on the master stack device;

configure each of the respective ports on the master stack device that received the first subset of the plurality of member stack device addresses as stack ports;

transmit, to each of the plurality of member stack devices that are associated with the first subset of the plurality of member stack device addresses, a second subset of the plurality of member stack device addresses that were not received via ports on the master stack device;

receive, from at least some of the plurality of member stack devices, identifications of ports that are included on the plurality of member stack devices, that received the second subset of the plurality of member stack device addresses, and that have been configured as stack ports and, in response, cause a reboot of the master stack device and each of the plurality of member stack devices; and provide, following the reboot of master stack device and each of the plurality of member stack devices, a stack that includes the master stack device and each of the plurality of member stack devices.

2. The system of claim 1, wherein each of the plurality of member stack devices that are associated with the first subset of the plurality of member stack device addresses includes:

a second processing system; and a second memory system that is coupled to the second processing system and that includes instructions that, when executed by the second processing system, cause the second processing system to provide a second stack engine that is configured to:

determine whether at least one of the second subset of the plurality of member stack device addresses were received via respective ports on that member stack device;

configure, in response to determining that the at least one of the second subset of the plurality of member stack device addresses were received via the respective ports on that member stack device, each of the respective ports on that member stack device that received the at least one second subset of the plurality of member stack device addresses as stack ports; and transmit, to the master stack device, an identification of each of the respective ports on that member stack device that were configured as stack ports.

3. The system of claim 1, wherein the first stack engine of the master stack device is configured to:

designate each of the plurality of member stack devices that transmitted the first subset of the plurality of member stack device addresses to the master stack device as discovered stack devices.

4. The system of claim 3, wherein the first stack engine of the master stack device is configured to:

designate each of the plurality of member stack devices that transmitted the second subset of the plurality of member stack device addresses to others of the plurality of member stack devices as discovered stack devices.

5. The system of claim 4, wherein the first stack engine of the master stack device is configured to:

determine that each of the plurality of member stack devices has been designated as a discovered stack device and, in response, cause at least one of the plurality of member stack devices, which has not configured a port on that member stack device as a stack port, to configure that port as a stack port.

6. The system of claim 4, wherein the first stack engine of the master stack device is configured to:

determine that each of the plurality of member stack devices has been designated as a discovered stack device; and cause, subsequent to a time period following the determination that each of the plurality of member stack devices has been designated as a discovered stack device, the reboot of the master stack device and each of the member stack devices.

7. The system of claim 1, wherein the causing the reboot of master stack device and each of the plurality of member stack devices includes the master stack device:

sending a reboot instruction to each of the plurality of member stack devices that causes each of those member stack devices to perform a reboot operation; and performing a reboot operation.

8. An Information Handling System (IHS), comprising:

a processing system; and a memory system that is coupled to the processing system and that includes instructions that, when executed by the processing system, cause the processing system to provide a stack engine that is configured to:

receive, from a management device, stack configuration information that includes a plurality of member stack device addresses;

identify, in a master stack device port/address database, a first subset of the plurality of member stack device addresses that were received via respective ports that are coupled to the processing system;

configure each of the respective ports that are coupled to the processing system and that received the first subset of the plurality of member stack device addresses as stack ports;

transmit, to each of a plurality of member stack devices that are associated with the first subset of the plurality of member stack device addresses, a second subset of the plurality of member stack device addresses that were not received via ports that are coupled to the processing system;

receive, from at least some of the plurality of member stack devices, identifications of ports that are included on the plurality of member stack devices, that received the second subset of the plurality of member stack device addresses, and that have been configured as stack ports and, in response, cause a reboot of the each of the plurality of member stack devices; and provide, following the reboot of each of the member stack devices, a stack that includes each of the plurality of member stack devices.

9. The IHS of claim 8, wherein the stack engine is configured to:

designate each of the plurality of member stack devices that transmitted the first subset of the plurality of member stack device addresses to the respective ports that are coupled to the processing system as discovered stack devices.

10. The IHS of claim 9, wherein the stack engine is configured to:
designate each of the plurality of member stack devices that transmitted the second subset of the plurality of member stack device addresses to others of the plurality of member stack devices as discovered stack devices.

11. The IHS of claim 10, wherein the stack engine is configured to:
determine that each of the plurality of member stack devices has been designated as a discovered stack device and, in response, cause at least one of the plurality of member stack devices, which has not configured a port on that member stack device as a stack port, to configure that port as a stack port.

12. The IHS of claim 10, wherein the stack engine is configured to:
determine that each of the plurality of member stack devices has been designated as a discovered stack device; and
cause, subsequent to a time period following the determination that each of the plurality of member stack devices has been designated as a discovered stack device, the reboot of the each of the member stack devices.

13. The IHS of claim 8, wherein the stack engine is configured to:
send a reboot instruction to each of the plurality of member stack devices that causes each of those member stack devices to perform a reboot operation; and
perform a reboot operation.

14. A method for automatically configuring a device stack, comprising:
receiving, by a master stack device from a management device, stack configuration information that includes a plurality of member stack device addresses;
identifying, by the master stack device in a master stack device port/address database, a first subset of the plurality of member stack device addresses that were received via respective ports on the master stack device;
configuring, by the master stack device, each of the respective ports on the master stack device that received the first subset of the plurality of member stack device addresses as stack ports;
transmitting, by the master stack device to each of a plurality of member stack devices that are associated with the first subset of the plurality of member stack device addresses, a second subset of the plurality of member stack device addresses that were not received via ports on the master stack device;
receiving, by the master stack device from at least some of the plurality of member stack devices, identifications of ports that are included on the plurality of member stack devices, that received the second subset of the plurality of member stack device addresses, and that have been configured as stack ports and, in response, causing a reboot of the master stack device and each of the plurality of member stack devices; and
providing, by the master stack device following the reboot of master stack device and each of the plurality of member stack devices, a stack that includes the master stack device and each of the plurality of member stack devices.

15. The method of claim 14, further comprising:
determining, by each of the plurality of member stack devices that are associated with the first subset of the plurality of member stack device addresses, whether at least one of the second subset of the plurality of member stack device addresses were received via respective ports on that member stack device;
configuring, by each of the plurality of member stack devices that are associated with the first subset of the plurality of member stack device addresses in response to determining that the at least one of the second subset of the plurality of member stack device addresses were received via the respective ports on that member stack device, each of the respective ports on that member stack device that received the at least one second subset of the plurality of member stack device addresses as stack ports; and
transmitting, by each of the plurality of member stack devices that are associated with the first subset of the plurality of member stack device addresses to the master stack device, an identification of each of the respective ports on that member stack device that were configured as stack ports.

16. The method of claim 14, further comprising:
designating, by the master stack device, each of the plurality of member stack devices that transmitted the first subset of the plurality of member stack device addresses to the master stack device as discovered stack devices.

17. The method of claim 16, further comprising:
designating, by the master stack device, each of the plurality of member stack devices that transmitted the second subset of the plurality of member stack device addresses to others of the plurality of member stack devices as discovered stack devices.

18. The method of claim 17, further comprising:
determining, by the master stack device, that each of the plurality of member stack devices has been designated as a discovered stack device and, in response,
causing at least one of the plurality of member stack devices, which has not configured a port on that member stack device as a stack port, to configure that port as a stack port.

19. The method of claim 17, further comprising:
determining, by the master stack device, that each of the plurality of member stack devices has been designated as a discovered stack device; and
causing, by the master stack device subsequent to a time period following the determination that each of the plurality of member stack devices has been designated as a discovered stack device, the reboot of the master stack device and each of the member stack devices.

20. The method of claim 14, wherein the causing the reboot of master stack device and each of the plurality of member stack devices includes:
sending, by the master stack device, a reboot instruction to each of the plurality of member stack devices that causes each of those member stack devices to perform a reboot operation; and
performing, by the master stack device, a reboot operation.

* * * * *